US00RE43838E

(19) United States
(12) Reissued Patent
Herold et al.

(10) Patent Number: US RE43,838 E
(45) **Date of Reissued Patent: *Dec. 4, 2012**

(54) METHOD FOR EXTRACTION AND ANALYSIS OF CONTENTS MADE FROM ORGANIC MATERIAL

(75) Inventors: Michael M. Herold, Berlin (DE); Martin Dostler, Henningsdorf (DE); Ralf Looser, Berlin (DE); Tilmann B. Walk, Kleinmachnow (DE); Achim Fegert, Limburgerhof (DE); Martin Kluttig, Neustadt (DE); Britta Lehmann, Berlin (DE); Silke Klein, Berlin (DE); Annette Hennig, Mahlow (DE); Joachim Kopka, Berlin (DE)

(73) Assignee: Metanomics GmbH (DE)

( * ) Notice: This patent is subject to a terminal disclaimer.

(21) Appl. No.: 12/987,582

(22) Filed: Jan. 10, 2011

Related U.S. Patent Documents

Reissue of:
(64) Patent No.: 7,311,838
Issued: Dec. 25, 2007
Appl. No.: 10/494,765
Filed: May 5, 2004

U.S. Applications:
(63) Continuation of application No. 12/644,679, filed on Dec. 22, 2009, now abandoned.

(30) Foreign Application Priority Data

Nov. 13, 2001 (DE) ..... 101 55 504
Jan. 29, 2002 (DE) ..... 102 03 552

(51) Int. Cl.
*B01D 11/00* (2006.01)

(52) U.S. Cl. ..... 210/638; 210/639; 210/656; 210/749; 210/770; 210/774; 210/806; 436/178; 554/20; 554/30; 554/174

(58) Field of Classification Search ..... 210/634, 210/635, 638, 639, 656, 749, 806, 632, 633, 210/770, 774; 422/70, 101; 435/4, 6, 7.1, 435/134–136; 554/8–23, 30, 174; 436/63, 436/86, 89, 161, 174, 178; 95/82; 560/78, 560/79, 98, 129, 179–182
See application file for complete search history.

(56) References Cited

U.S. PATENT DOCUMENTS

| | | | | |
|---|---|---|---|---|
| 3,436,413 | A | | 4/1969 | Okany |
| 3,996,132 | A | | 12/1976 | Mateos et al. |
| 4,283,199 | A | | 8/1981 | Szabo |
| 4,460,504 | A | | 7/1984 | Rubin et al. |
| 5,204,250 | A | | 4/1993 | Shinmen et al. |
| 5,219,733 | A | | 6/1993 | Myojo et al. |
| 5,420,010 | A | * | 5/1995 | Finke et al. ..... 435/7.1 |
| 5,529,267 | A | * | 6/1996 | Giras et al. ..... 246/120 |
| 5,658,767 | A | | 8/1997 | Kyle |
| 5,714,071 | A | | 2/1998 | Matsuo et al. |
| 6,790,669 | B1 | | 9/2004 | Pfeiffer et al. |
| 7,311,838 | B2 | | 12/2007 | Herold et al. |
| 7,431,841 | B2 | | 10/2008 | Herold et al. |
| 2002/0146784 | A1 | | 10/2002 | Suzuki et al. |
| 2004/0260105 | A1 | | 12/2004 | Herold et al. |

FOREIGN PATENT DOCUMENTS

| | | | |
|---|---|---|---|
| EP | 0 290 156 A | | 11/1988 |
| EP | 0 290 156 A2 | | 11/1988 |
| JP | 7238031 | | 9/1995 |
| KR | 9402797 | | 4/1994 |
| WO | WO 01/04622 | * | 1/2001 |
| WO | WO-01/04622 A1 | | 1/2001 |

OTHER PUBLICATIONS

Katona, Z.F., et al., "Simultaneous Determination of Sugars, Sugar Alcohols, Acids and Amino Acids in Apricots by Gas Chromatography-Mass Spectrometry", Journal of Chromatography A, vol. 847, (1999), pp. 91-102.

Trethewey, R.N., "Commentary Metabolic Profiling: A Rosetta Stone for Genomics?", Current Opinion in Plant Biology, vol. 2, (1999), pp. 83-85.

Sauter, H., et al., "Metabolic Profiling of Plants: A New Diagnostic Technique", ACS Symposium Series, (Synth. Chem, Agrochem. II, American Chemical Society, Washington, DC) vol. 443, (1991), pp. 288-299.

Fiehn, O., et al., "Identification of Uncommon Plant Metabolites Based on Calculation of Elemental Compositions Using Gas Chromatography and Quadrupole Mass Spectrometry", Anal. Chem., vol. 72, (2000), pp. 3573-3580.

Fiehn O., et al., "Metabolic Profiling for Plant Functional Genomics", Nature Biotechnology, vol. 18, (2000), pp. 1157-1161.

(Continued)

*Primary Examiner* — Joseph Drodge
(74) *Attorney, Agent, or Firm* — Connolly Bove Lodge & Hutz LLP

(57) ABSTRACT

The present invention relates to a process for isolating constituents from organic material, comprising the following process steps:

a) freeze-drying of the organic material;
b) extracting the constituents with a polar solvent or solvent mixture (A) and an organic solvent or solvent mixture (B), it being possible for the extracts of the extraction with (A) and (B) to form one phase;
c) combining the extracts (A) and (B) to give one phase; and
d) carrying out an esterification/transesterification in the unpolar phase with an alcohol, the esterification/transesterification being carried out in the presence of a volatile acid;

the process being a high-throughput process.

34 Claims, No Drawings

OTHER PUBLICATIONS

Roessner, U., et al., "Simultaneous Analysis of Metabolites in Potato Tuber by Gas Chromatograhy-Mass Spectrometry", The Plant Journal, vol. 23, No. 1, (2000), pp. 131-142.

Gilmour, S.J., et al., "Overexpression of the Arabidopsis *CBF*3 Transcriptional Activator Mimics Multiple Biochemical Changes Associated with Cold Acclimation", Plant Physiology, vol. 124, (2000), pp. 1854-1865.

Strand, A., et al., "Acclimation of Arabidopsis Leaves Developing at Low Temperatures. Increasing Cytoplasmic Volume Accompanies Increased Activities of Enzymes in the Calvin Cycle and in the Sucrose-Biosynthesis Pathway", Plant Physiology, vol. 119, (1999), pp. 1387-1397.

Kellner, R., et al., "Liquid Chromatography", Analytical Chemistry, Weinheim, (1998). p. 195.

Bligh, E.G., et al., "A Rapid Method of Total Lipid Extraction and Purification", Can. J. Biochem. Physiol., vol. 37, No. 8, (1959), pp. 911-917.

Richter, B.E., et al., "An Accelerated Solvent Extraction System for the Rapid Preparation of Environmental Organic Compounds in Soil", American Lab., vol. 27, (1995), pp. 24-28.

Ezzell, J.L., et al., "A Comparison of Accelerated Solvent Extraction with Conventional Solvent Extraction for Organophosphorus Pesticides and Herbicides", LC-GC, vol. 13, No. 5, (1995), pp. 390-398.

Björklund, E., et al., "Pressurized Liquid Extraction of Persistent Organic Pollutants in Environmental Analysis", Trends in Analytical Chemistry, vol. 19, No. 7, (2000), pp. 434-445.

Zs, F. Katona, et al., "Simultaneous Determination of Sugars, Sugar Alcohols, Acids and Amino Acids in Apricots by Gas Chromatography-Mass Spectrometry," *Chromatography,* 847, 1999, 91-102.

R. N. Trethewey, et al., "Commentary: Metabolic Profiling: a Rosetta Stone for Genomics?" *Curr. Opin. Plant. Biol.,* 2, 1999, 83-85.

H. Sauter, et al., "Metabolic Profiling of Plants: A New Diagnostic Technique," *ACS Symposium Series 1991*, (Synth. Chem. Agrochem. II, American Chemical Society, Washington, DC), 443, 1991, 288-299.

O. Fiehn, et al., "Metabolite Profiling for Plant Functional Genomics," *Nature Biotechnology,* 18, 2000, 1157-1161.

O. Fiehn, et al., "Identification of Uncommon Plant Metabolites Based on Calculation of Elemental Compositions Using Gas Chromatography and Quadrupole Mass Spectrometry," *Anal. Chem,* 72, 2000, 131-142.

U. Roessner, et al., "Simultaneous Analysis of Metabolites in Potato Tuber by Gas Chromatography-Mass Spectrometry," *The Plant Journal,* 23, 2000, 131-142.

S. J. Gilmour, et al., "Overexpress of the Arabidopsis *CBF*3 Transcriptional Activator Mimics Multiple Biochemical Changes Associated with Cold Acclimation," *Plant Physiology,* 124, 2000, 1854-1865.

A. Strand, et al., "Acclimation of Arabidopsis Leaves Developing at Low Temperatures. Increasing Cytoplasmic Volume Accompanies Increased Activities of Enzymes in the Calvin Cycle and in the Sucrose-Biosynthesis Pathway," *Plant Physiology,* 119, 1999, 1387-1397.

R. Kellner, et al., "Liquid Chromatography," *Analytical Chemistry,* Weinheim, 1998, 195.

E. G. Bligh, et al., "A Rapid Method of Total Lipid Extraction and Purification," *Can. J. Biochem. Physiol.,* 37, 1959, 911-917.

E. Bjorklund, et al., "Pressurized Liquid Extraction of Persistent Organic Pollutants in Environmental Analysis," *Trends in Analytical Chemistry,* 19 (7), 2000, 434-445.

B. E. Richter, et al., "An Accelerated Solvent Extraction System for the Rapid Preparation of Environmental Organic Compounds in Soil," *American Lab.,* 27, 1995, 24-28.

J. L. Ezzell, et al., "A Comparison of Accelerated Solvent Extraction with Conventional Solvent Extraction for Organophosphorus Pesticides and Herbicides," *LC-GC,* 13 (5), 1995, 390-398.

* cited by examiner

METHOD FOR EXTRACTION AND ANALYSIS OF CONTENTS MADE FROM ORGANIC MATERIAL

Matter enclosed in heavy brackets [ ] appears in the original patent but forms no part of this reissue specification; matter printed in italics indicates the additions made by reissue.

RELATED APPLICATIONS

This application is *a reissue Continuation of application Ser. No. 12/644,679 which is a reissue application of U.S. Ser. No. 10/494,765, now U.S. Pat. No. 7,311,838, for which reissue has been requested, which is* a national stage application (under 35 U.S.C. 371) of PCT/EP02/12552 filed Nov. 11, 2002, which claims the benefit of German application 10155504.0 filed Nov. 13, 2001 and German application 10203552.0 filed Jan. 29, 2002.

FIELD OF THE INVENTION

The present description relates to a process for isolating constituents from organic material, which comprises the following process steps:

(a) freeze-drying of the organic material;

(b) extracting the constituents with a polar solvent or solvent mixture (A) and an organic solvent or solvent mixture (B), it being possible for the extracts of the extraction with (A) and (B) to form one phase;

(c) combining the extracts (A) and (B) to give one phase; and (d) carrying out an esterification/transesterification in the unpolar phase with an alcohol, the esterification/transesterification being carried out in the presence of a volatile acid;

the process being a high-throughput process.

DESCRIPTION OF THE BACKGROUND

The understanding of the biochemical synthetic pathways in the metabolism of animal or plant cells, including microorganisms such as bacteria, fungi and algae, or mammalian cells, remains very rudimentary, even though the main synthetic pathways are known. To date, the determination of physiological states during growth, development or as a response to environmental stress is essentially limited to the study of individual target molecules such as, for example, RNA and proteins. However, changes in the mRNA or protein level or their activity can frequently not be correlated with changes in the metabolism or indeed with phenotypic functions.

Cellular constituents or metabolites are frequently analyzed directly either by specific enzymatic reactions, immunoassays or on the basis of chromatographic methods, which identify certain substances by their retention times or coelution with reference substances. As described in Katona, J. Chromatography 1999, 847, 91-102, most of the prior art only deals with the analysis of few, specific components, for example acids or sugars.

There have only been rudimentary attempts to demonstrate that metabolic products, or metabolites, constitute not only intermediates or end products, but also act as sensors and regulators. The analysis of complex metabolic profiles or of constituents in organisms is therefore of great importance in assigning gene functions, in the assessment of stress effects and, last but not least, in the assessment of the safety and value of genetically modified organisms.

To be able to study these relationships, however, it is generally necessary to study organic systems as detailed and reproducibly as possible under different conditions so that, for example genetic variabilities or various internal or external effects can be identified. This, however, necessarily requires the analysis of a large number of samples.

The most advanced aspect of the determination of complex metabolic profiles (irrespective of whether this determination is limited to various classes of substances, developmental stages or types of material, i.e. irrespective of whether it takes the form of metabolic fingerprinting, metabolic profiling or metabolomics) in diagnostic screens, which first profiles have also recently been described for plants (for a review see Trethewey, Curr. Opin. Plant. Biol. 1999, 2, 83-85). Thus, Sauter (ACS Symposium Series 1991, 443 (Synth. Chem. Agrochem. 2), American Chemical Society, Washington, D.C., 288-299) demonstrates the modification of constituents in barley following treatment with various herbicides. Between 100 and 200 signals were detected and identified with the aid of reference substances via their retention coefficients in gas chromatography (GC) or via gas chromatography/mass spectrometry analysis (GC/MS).

Fiehn, Nature Biotechnology 2000, 18, 1157-1161 describes the quantification of 326 substances in Arabidopsis thaliana leaf extracts. To compare four different genotypes, present plant samples were homogenized in a complicated procedure, extracted with 97% by volume of methanol, and, after addition of chloroform and water, a multi-step procedure gave a polar and an unpolar phase which were then analyzed by LC/MS and GC/MS (see also Fiehn, Anal. Chem. 2000, 72, 3573-3580; http://www-.mpimp-golm.mpg.de/fiehn/blatt-protokoll-e.html). Following a very similar method, Roessner, The Plant Journal 2000, 23, 131-142, extracts plant constituents with methanol and compare the profiles of polar metabolites of in-vitro potato plants and potato plants grown in soil.

Gilmour, Plant Physiology 2000, 124, 1854-1865 extracts sugar from lyophilized leaves of five different Arabidopsis species in 80% ethanol following incubation for 15 minutes at 80° C. and incubation overnight at 4° C. Strand, Plant Physiology 1999, 119, 1387-1397 extracts soluble sugars and starch twice in succession, likewise at 80° C. and for 30 minutes and in 80% ethanol with Hepes, pH 7.5. The material is then reextracted twice at this high temperature to improve the result of the extraction once with 50% ethanol/Hepes, pH 7.5, and once with Hepes, pH 7.5.

These methods described in the prior art only permit limited automation which, moreover, can only be realised in the form of a complex procedure. In particular the processing of large sample numbers, the determination of the effect of a variety of stress factors on the metabolism of the organisms or the observation of dynamic processes, which requires a continuous analysis of samples during windows which are often very short, require processes (a) which are rapid, i.e. for example that fixing and analysis of the samples is effected within a short period of the sampling, (b) which are highly reproducible, i.e. for example that an analysis carried out with a large number of different samples gives results within a very narrow error margin, (c) which are simple to handle, i.e. for example that the process can be automated and does not require complex or laborious procedures, (d) which are open, i.e. for example that a large number of substances can be analyzed, and/or (e) which are sensitive, i.e. for example that the analysis identifies even small changes in substance concentrations and small amounts of substance.

With a larger number of samples, it is particularly necessary to ensure sample stability, and thus the reproducibility of the results. A comprehensive continuous analysis of biological material, for example animal samples or plant samples, or for example the interaction between a substance, or substances, and organisms in complex systems and their course over time is thus not possible with the prior-art processes.

SUMMARY OF THE INVENTION

The present invention overcomes the problems and disadvantages associated with current strategies and designs and provides new processes for isolating constituents from organic material.

One embodiment of the invention is directed to A process for isolating constituents from organic material, comprising freeze-drying the organic material; extracting the constituents with a polar solvent or solvent mixture (A) and an organic solvent or solvent mixture (B), it being possible for the extracts of the extraction with (A) and (B) to form one phase; combining the extracts (A) and (B) to give one phase; and carrying out an esterification/transesterification in the unpolar phase with an alcohol, the esterification/transesterification being carried out in the presence of a volatile acid; the process being a high-throughput process. Another embodiment of the invention is directed to constituents isolated by a process of the invention.

Other embodiments and advantages of the invention are set forth in part in the description, which follows, and in part, may be obvious from this description, or may be learned from the practice of the invention.

DESCRIPTION OF THE INVENTION

It is an object of the present invention to find a process which permits overcoming the abovementioned shortcomings of the prior-art processes and which makes possible the rapid and simple analysis of, in particular a substantial number of, samples with a high degree of sensitivity and reproducibility. We have found that this object is achieved by the embodiments characterized in the claims of the present invention.

Accordingly, the application relates to a process for isolating constituents from organic material, comprising the following process steps:

a) freeze-drying of the organic material;

b) extracting the constituents with a polar solvent or solvent mixture (A) and an organic solvent or solvent mixture (B), it being possible for the extracts of the extraction with (A) and (B) to form one phase;

c) combining the extracts (A) and (B) to give one phase; and d) carrying out an esterification/transesterification in the unpolar phase with an alcohol, the esterification/transesterification being carried out in the presence of a volatile acid;

the process being a high-throughput process.

The term "organic material" refers to any organic or biological material, such as material of plants, animals, microorganisms, for example protists, fungi, bacteria, algae, viruses and the like, such as organisms separated from culture material, body fluids such as blood, lymph, secretions, or foodstuffs, feedstuffs and other animal or plant products. Likewise, it refers to culture material in which organisms live, i.e. for example also after the organisms have been removed, for example media for growing micro-organisms such as protists, for example kinetoplasts, plasmodia or bacteria, for example Gram-positive or Gram-negative bacteria, or algae or fungae, for example yeasts, or animal or plant cells.

The term "extraction" or "to extract" as used in the present invention refers to the transfer of substances contained in a solid or liquid sample, for example constituents of organic material, into the respective solvent or solvent mixture using unpolar to polar solvents or solvent mixtures. The hydrophilic constituents, including, for example, metabolites, dissolved in a polar solvent, such as, for example, water, while the hydrophobic constituents, including, for example, metabolites, are dissolved in a lipophilic solvent.

"Polar solvents or solvent mixtures" refers to a solvent or solvent mixture with a polarity index of from 4 to 10.2, preferably from 5 to 7, more preferably from 5.5 to 6.5, as described by Kellner, Analytical Chemistry, Weinheim, 1998, p. 195. Polar solvents are, for example, water including aqueous solutions, or polar aprotic or protic organic solvents, for example alkyl alcohols with an alkyl radical having 1 to 6 carbon atoms, for example methanol, ethanol, 1-propanol, 2-propanol, butanol, pentanol, hexanol or, for example, acetone, acetonitrile, ethyl acetate, dimethyl sulfoxide or N,N-dimethylformamide, or other solvents with a polarity greater than or equal to 0.50, as stated for example in Kuster/Thiel, Rechentafeln für die Chemische Analytik [Nomograms for technical analysis], Walter de Gruyter, Berlin/New York 1993, p. 359, or are mixtures of these. Thus, for example, a solvent mixture of 80% methanol/20% water used in accordance with the invention has the polarity index of 6.1 as defined by Kellner, 1998.

An "unpolar solvent" or "unpolar solvent mixture" refers to a solvent or solvent mixture with a lower polarity or a lower polarity index than solvent or solvent mixture (A) and with which substances of medium polarity to unpolar substances can be extracted better, in particular solvents or solvent mixtures with a polarity index as defined by Kellner, Analytical Chemistry, Weinheim, 1998, p. 195, which falls short of the polarity index of the extractant of the polar phase by 0.3 or more. More preferably, the polarity index as defined by Kellner, 1998, falls short of that of the extractant of the polar phase by 0.5, even more preferably by 1, most preferably by more than 2. Accordingly, the polarity index of the unpolar solvent especially preferably has a value of from 5.5 to 1, more preferably from 5 to 2, most preferably from 4.5 to 3.5 as defined by Kellner, 1998. Thus, for example, a solvent mixture of 40% methanol/60% dichloromethane employed in accordance with the invention has a polarity index of 3.9 as defined by Kellner, 1998. "Unpolar solvents" are, for example, organic solvents, for example halogen-containing solvents such as chloroform, dichloromethane, carbon tetrachloride or aliphatic solvents such as hexane, cyclohexane, pentane, heptane and the like, or aromatic solvents such as, for example, toluene or benzene, or ethers such as for example, tert-butyl methyl ether, diethyl ether or tetrahydrofuran, or other solvents with a polarity of less than 0.50 as stated for example in Küster/Thiel 1993, or mixtures of these. A "polar phase" or a "polar extract" refers to a phase or an extract which is obtained by extraction with a solvent or solvent mixture with a polarity index of from 4 to 10.2, preferably from 5 to 7, more preferably from 5.5 to 6.5 as defined by Kellner, Analytical Chemistry, Weinheim, 1998, p. 195, or which is obtained by extraction with a polar solvent or solvent mixture as stated above.

An "unpolar phase" or an "unpolar extract" refers to a phase or extract which has a lower polarity or a lower polarity index relative to the polar phase and with which substances of medium polarity to unpolar substances can be extracted better, such as, for example, in the case of extraction with unpolar solvents or solvent mixtures as stated above. In accordance with the invention, an "unpolar phase" or an "unpolar extract" is obtained by extraction with a solvent or solvent mixture with a polarity index as defined by Kellner, Analytical Chemistry, Weinheim, 1998, p. 195, which falls short of the polarity index of the extractant of the polar phase/of the polar extract by 0.3 or more. More preferably, the polarity index as defined by Kellner, 1998, falls short of the polarity index of the extractant of the polar phase by 0.5, even more preferably by 1, most preferably by more than 2.

The term "constituents" refers to polar and unpolar compounds, for example "metabolites", which originate from the catabolic or anabolic reactions of the metabolism or which are taken up by organisms from their environment. This relates to compounds which are localized cellularly or, in more complex organisms, also extracellularly, for example in body fluids. In the culture of microorganisms or other organisms, the constituents of these cultures, for example of the culture medium, are also encompassed. The concentration of a constituent is affected by external factors (environmental conditions, nutrient conditions, stress situation) or by internal conditions (developments, regulations, changes owing to genetic influence) which the organisms are subjected to. The term refers both to what are known as primary metabolites and to secondary metabolites. "Primary metabolites" refer, as a rule, to those metabolites which are products of catabolic and anabolic pathways and which are of fundamental importance for the cell and thus more or less identical for all cells. "Secondary metabolites" refers, as a rule, to compounds which are formed predominantly in secondary pathways, for example in the case of stress situations, such as hunger or deficiency conditions, or after the active growth phase of the cell has ended and of which no discernible cellular function is known in many cases (see also Römpp Lexikon Biotechnologie, New York, 1992). Constituents are therefore understood as meaning for example polar and unpolar substances such as carbohydrates, amines (in particular amino acids), tetrapyrroles, lipids, steroids, nucleotides, nucleosides, cofactors, coenzymes, vitamins, antibiotics, hormones, peptides, terpenes, alkaloids, carotenoids, xanthophylls, flavoids and the like, and the substances of the respective metabolic pathways, without the above or the following enumeration in any form being considered as limiting.

Carbohydrates encompass for example the carbohydrates of the carbohydrate metabolism, for example glycolysis, gluconeogenesis, for example trioses, tetroses, pentoses, for example furanoses, or hexoses, for example pyranoses, or heptoses, of the polysaccharide metabolism or of the pyruvate metabolism, of the acetyl coenzyme A metabolism, di- or oligosaccharides, glycosides, hexose derivatives, deoxy hexoses, carbohydrates of the pentose metabolism, of the amino sugar metabolism, of the tricarboxylic acid cycle, of the glyoxylate metabolism and the like, or other substances of the respective metabolic pathways.

Amino acids encompass for example the amino acids of the amino acids metabolisms such as, for example, in the ammonia metabolism, or of the sulfur metabolism, the urea cycle, or their derivatives, for example aromatic or nonaromatic amino acids, polar uncharged, unpolar, aliphatic, aromatic, positively-charged, negatively-charged amino acids, branched-chain or straight-chain, essential or nonessential amino acids, or other substances of the respective metabolic pathways.

Tetrapyrroles encompass, for example, substances of the protoporphyrin metabolism, the haemoglobin metabolism, the myoglobin metabolism, the various cytochrome metabolisms, the photosynthetic metabolisms and the like, or other substances of the respective metabolic pathways.

Lipids encompass for example saturated or unsaturated, essential or nonessential fatty acids, acyl-CoA compounds, triacylglycerides, lipids of lipogenesis or lipolysis, phospholipids, for example glycerophospholipids, ether lipids, sphingophospholipids, glycolipids, or the substances of the respective metabolic pathways.

Hormones encompass steroids or nonsteroid hormones, for example peptide hormones or, for example, eicosanoids.

Steroids encompass for example the substances of the cholesterol metabolism, hopanoids, plant steroids such as phyto- and mycosteroles, insect hormones, isoprenoids, steroid hormones, gestagens, androgens, oestrogens, corticosteroids or the substances of the respective metabolic pathways.

Nucleotides and nucleosides encompass, for example, deoxyribonucleotides/nucleosides and ribonucleotides/nucleosides, their 5'-phosphate derivatives, purines, pyrimidines or their derivatives, for example cyclized, methylated and/or acetylated nucleoside or nucleotide derivatives and the like, or other substances of the respective metabolic pathways.

Likewise included are substances which play a role in these metabolic pathways. "Other substances of the respective metabolic pathways" refers to the respective intermediates in the biosynthesis, in the conversion, the transport or the metabolism of the substances mentioned. An overview of the many metabolites can be found for example in Michal, Biochemical Pathways, Berlin, 1999 or in KEGG, Kyoto Encyclopedia of Genes and Genomes, Institute of Chemical Research at Kyoto University, Japan (z. B. http://www-.genome.ad.jp/dbget/ligand.html), which are expressly incorporated herewith.

The term "water" refers to any type of aqueous solution, including, for example, deionized, demineralized, distilled or twice-distilled water. One or more substances which preferably include the extraction, stability or solubility of the constituents of the organic material or which bring about preferred properties, for example pH value, conductivity, salt concentration and the like, may also be dissolved in the water or mixed therewith, as is the case, for example, in salt solutions or buffer solutions.

"Volatile acids" refers to an acid which can essentially be removed by evaporation, that is to say up to at least 80%, preferably 90%, more preferably 95% or more, most preferably all, of the acid can be removed by evaporation.

The process according to the invention is particularly suitable as a high-throughput process for extracting organic material and derivatizing and analyzing the extracts of a large number of samples, in particular plant samples.

The processes described in the prior art require freezing and mechanical pulverizing of the frozen samples, separation of the organic phase from the aqueous phase when preparing total extracts containing both the lipophilic and the polar metabolites and extensive wash steps of an organic phase with an aqueous solution for removing the acid, followed by the laborious removal of water from the organic solvent and, if appropriate, filtration of the sample material; steps which are time-consuming and can only be automated with a high degree of complexity, if at all (Fiehn, Anal. Chem. 2000 and Nature Biotechnology 2000). Only the process according to the invention discloses the essential process steps which permit efficient and comprehensive automation, in conjunction with an acceleration of the process.

The process according to the invention avoids enzymatic processes taking place in the samples up to the extraction, processes which modify the constituent profile, causing reproducibility and precision of the readings to suffer. It is therefore particularly advantageous that one process step involves freeze-drying of the material. Freeze-drying removes the water from the material so that enzymatic processes are inhibited. Moreover, using freeze-drying is economically and ecologically advantageous since the samples thus prepared can be stored and processed at room temperature. This not only permits automatic processing and analysis of the sample in a less complex and more inexpensive manner, but also saves energy costs since a continuous cooling circuit can be dispensed with.

Another advantage is that the combined extracts form one phase in the process according to the invention. The advantage of the repeated monophasic mixing of the two extracts prior to phase separation is that residues of polar substances from the unpolar extraction migrate into the polar phase and, conversely, residue of unpolar compounds from the polar phase migrates into the corresponding unpolar phase. This increases the sensitivity, accuracy, precision, variability and reproducibility of a high-throughput process.

The extractions with solvent (mixture) (A) and (B) lead, after the extraction, to a polar phase and an unpolar phase and can be carried out in parallel, for example when the sample is first divided and then the respective extracts are prepared, or else sequentially, for example, when the same samples after the separation of the first extractant are treated with a second extractant, the sequence (A) (B) being just as possible as the sequence (B) (A), and intermediate steps also being possible. It is also possible to combine the steps with other steps. Most preferred is the sequence (A) (B).

After the two phases have been combined into one phase, the two phases can again be separated into a polar and an unpolar phase by methods known to the skilled worker, see, for example, Bligh and Dyer, Can. J. Biochem. Physiol. 1959, 37, 911-917, for example by addition of an unpolar solvent or solvent mixture, in particular an unpolar organic (for example dichloromethane) solvent or solvent mixture as described above, or of a polar solvent or solvent mixture as described above, in particular an aqueous solution, for example a buffer, or by the addition of not only an unpolar solvent or solvent mixture, but also of a polar solvent or solvent mixture. The phase separation is preferably achieved by adding one of the solvents used for the extraction, in particular by methanol, dichloromethane and/or water.

The use of a volatile, preferably readily volatile, acid for the esterification/transesterification in the polar phase, for example HCl, is a further essential step of the process according to the invention. In accordance with the invention, the acid used has a lower vapor pressure than the solvent used or the components of the solvent mixture or a possible azeotrope of all or some of the components including the acid itself. In contrast to the processes described in the prior art, the use of volatile acids allows the acid residues to be removed rapidly by evaporation, which can be automated, while in the prior art the acid residues must be removed by wash steps followed by drying, for example using a desiccant such as sodium sulfate, and filtration. The solvent which can be employed for the esterification/transesterification is an alkyl alcohol with an alkyl radical having 1 to 8 carbon atoms, as described above, optionally with a content of an inert solvent or solvent mixture, for example chloroform, dichloromethane, benzene and/or toluene. A mixture of chloroform, methanol, toluene and hydrochloric acid is especially preferred.

In the process according to the invention, the esterification/transesterification can be carried out in the polar and/or the unpolar phase of the extraction. The esterification/transesterification is preferably only carried out in the unpolar phase. The esterification/transesterification according to the invention of the constituents or some of the constituents which have been extracted is preferably carried out with an unsaturated or saturated straight-chain, branched or cyclic alkyl alcohol having 1 to 8 carbon atoms, for example methanol, ethanol, 1-propanol, 2-propanol, butanol, pentanol, hexanol and the like. Methanol or ethanol are preferred, with methanol being most preferred. The reaction temperature is preferably between 70 and 150° C., more preferably between 90 and 120° C., with 100° C. being most preferred. The reaction time is preferably between 0.5 h and 4 h, more preferably between 1 h and 3 h. Other solvents which are inert during the reaction may be present, for example toluene, dichloromethane, benzene and/or chloroform. Mixtures of the alcohols and/or inert solvents may also be used. The solvent may also contain 0% by volume to 20% by volume of water, preferably less than 10% by volume, with less than 5% by volume being most preferred. The content of other solvents in addition to the abovementioned alcohols is preferably 0% by volume to 20% by volume, preferably less than 10% by volume, most preferably 0% by volume.

The esterification/transesterification is carried out in accordance with the invention using a volatile acid.

The processes described in the prior art are not suitable for a high-throughput extraction of metabolites from organic material, or to a limited extent only. Known diagnostic extractions relate mainly to analyses of fluids, for example urine, so that these processes are not suitable for working up solid samples, in particular plant cell samples.

The process according to the invention is optimized for high throughput and the use of robotics, and the manual work is reduced over the prior art, in particular over processes which exhibit only some, or none, of steps (a) to (d) in this form, by at least 10%, preferably 20%, more preferably by more than 30%, most preferably by at least 50%.

Advantageously, the sample mix-up rate is reduced by more than 10%, more preferably by more than 20%, even more preferably by more than 30%, most preferably by more than 50% over the prior art by the process according to the invention and its possibility of using automation and robotics, in particular by the processes which exhibit only some, or none, of steps (a) to (d) in this form. Likewise, a considerably increased reproducibility in a high-throughput analysis is achieved by the process steps according to the invention. The increased reproducibility of the process according to the invention is characterized by an analytical variability which is at least 10%, preferably 20%, more preferably at least 30%, most preferably at least 50% less than in the prior art, in particular over processes which only contain some or none of steps (a) to (d) in this form. A further advantageous aspect is that a constituent profile is covered by the use forms of the process according to the invention which are described herein which is more than 5%, preferably 10%, more preferably 20%, even more preferably 50% wider than the prior art, in particular over processes which exhibit only some, or none, of the steps (a) to (d), in this form.

The mixture (A) is preferably an alcohol/water mixture with 10% by volume or less, preferably 0% by volume, of other solvent or solvent mixtures.

As a rule, polar substances are extracted in the prior art with pure alkyl alcohols such as ethanol (Sauter, 1991, Strand, 1999, Gilmour, 2000) or methanol (Fiehn, Anal. Chem. 2000 und Nature Biotechnology 2000, Roessner, 2000) or with alkyl alcohols in mixture with water or buffer solutions, or with water or buffer solutions.

Water has very good extractant properties for polar substances. However, the fact that cellular processes, which, as a rule, have previously been stopped by freezing or freeze-drying, are reactivated in aqueous solutions. This may bring about for example an enzymatic degradation or transformation of various metabolites and thus leads to a modification and, hence, falsification, of the concentrations or ratios within these extracts. As a rule, it is attempted to prevent these undesired side reactions by working on ice. However, this has considerable disadvantages not only for the extraction efficacy, but also for the processing of large sample numbers. A loss in sensitivity and deviation of the actual cellular state at the time of harvesting are unavoidable.

Ethanol or methanol are used firstly because they have polar properties and thus extract hydrophilic constituents to a sufficient degree, and, secondly, since after their addition to a cell extract the activity of the cell extract is inhibited owing to the toxic, denaturing effect of the alcohol. Thus, further reaction of the metabolites can no longer take place, and the cells are "frozen" at the metabolic stage of precisely this moment. However, the disadvantage is that some polar classes of metabolites are only sparingly soluble in methanol or ethanol. This leads to a loss in sensitivity and may also have an effect on the reproducibility of the results.

The use of methanol or ethanol as alkyl alcohol is preferred, the use of methanol being more preferred. The mixture preferably has a polarity index of from 4 to 10.2, especially preferably of from 5 to 7, most preferably of from 5.5 to 6.5, as defined by Kellner, 1998.

In an especially preferred embodiment, the polar solvent mixture (A) is composed of a monophasic mixture of 50 to 90% by volume of $C_1$- to $C_6$-alkyl alcohol, for example methanol, ethanol, 1-propanol, 2-propanol, butanol, pentanol or hexanol, and 10 to 50% by volume of water.

In an especially preferred embodiment, the monophasic mixture according to the invention is composed of at least 50% by volume of methanol, 10% by volume to 50% by volume of water, preferably only of methanol and/or water, the mixture comprising more than 50% by volume of water. This step of the process according to the invention leads to a higher yield than when extraction is performed with pure methanol or ethanol. Moreover, the stability of the extract is increased over a water-only extraction, and the reproducibility of the process is thus substantially improved. In contrast to extraction with ethanol/water mixtures, the yield is so high that a simple extraction step suffices for isolating a very large number of constituents. In processes based on the extraction step according to the invention for the isolation of polar substances from plant cells, the number of substances analyzed was only limited by the analytical method. A very high reproducibility was obtained.

Preferably, the mixture contains at least 70% by volume to 90% by volume of methanol, with 75% by volume to 85% by volume being more preferred and 80% by volume of methanol being most preferred. Also preferred are 10% by volume to 50% by volume of water. More preferred are less than 40% by volume of water, even more preferred less than 30% by volume of water. 15% by volume to 25% by volume of water are most preferred. Accordingly, the process according to the invention is preferably carried out with a mixture of 80% by volume of methanol and 20% by volume of water. If appropriate, the mixture may also contain small amounts of another solvent or solvent mixture, for example dichloromethane, but less than 10% by volume are preferred, with less than 5% by volume being more preferred and no other solvent in the mixture being most preferred.

The solvent or solvent mixture (B) is, in accordance with the invention, an organic solvent or a mixture of one or more polar solvents, for example alkyl alcohols with an alkyl radical having 1 to 6 carbon atoms, for example methanol, ethanol, 1-propanol, 2-propanol, butanol, pentanol, hexanol or, for example, acetone, acetonitrile, ethyl acetate, dimethyl sulfoxide or N,N-dimethylformamide, or other solvents with a polarity greater than or equal to 0.50, for example as stated in Küster/Thiel 1993, and one or more above-described unpolar organic solvents, for example halogen-containing solvents such as chloroform, dichloromethane, carbon tetrachloride, or aliphatic solvents such as hexane, cyclohexane, pentane, heptane and the like, or aromatic solvents such as, for example, toluene or benzene, or ethers such as, for example, tert-butyl methyl ether, diethyl ether or tetrahydrofuran, or other solvents with a polarity of less than 0.50 as stated for example in Kuster/Thiel 1993.

The solvent or solvent mixture (B) is more unpolar than the solvent or solvent mixture (A). According to the invention, the polarity index (as defined by Kellner, 1998) of (B) falls short of that of the extractant of the polar phase by 0.3 or more. More preferably, the polarity index as defined by Kellner, 1998, falls short of that of the extractant of the polar phase by 0.5, even more preferably 1, most preferably more than 2. Preferably, the polarity index of the unpolar solvent has a value of 1 to 5.5, more preferably 5, most preferably less than 4.5 as defined by Kellner, 1998. Thus, a solvent mixture employed in accordance with the invention is 40% methanol/60% dichloromethane has, for example, a polarity index of 3.9 as defined by Kellner, 1998.

The abovementioned mixture preferably comprises a solvent component which is not miscible with water so that, when the phases are subsequently combined, phase separation into an unpolar and a polar phase can be brought about. Preferably, the component is miscible with a $C_1$- to $C_6$-alcohol, in particular ethanol or methanol. The halogenated solvents are especially preferred. A low boiling point, for example of under 100° C., more preferably under 80° C., even more preferably under 60° C. and most preferably under 40° C. under atmospheric pressure is furthermore advantageous since removal of the solvent or solvent mixture can be carried out more rapidly and at lower temperatures less destructively regarding the constituents. Preferred is a mixture of methanol or ethanol and chloroform, pentane, hexane, heptane, cyclohexane, carbon tetrachloride, ethyl acetate or dichloromethane. More preferred is a mixture of methanol or ethanol with chloroform or dichloromethane.

The solvent mixture (B) is especially preferably composed of a monophasic mixture of 30% by volume to 60% by volume of $C_1$- to $C_6$-alkyl alcohol, as mentioned above, 40% by volume to 70% by volume of chloroform or dichloromethane and 0% by volume to 30% by volume of a further solvent or solvent mixture, preferably methanol and/or chloroform and/or dichloromethane, with no more and no less than the abovementioned percentages of alkyl alcohol and/or dichloromethane and/or chloroform. The alkyl alcohol is preferably methanol or ethanol, especially preferably methanol.

The unpolar solvent is preferably dichloromethane or chloroform, with the use of dichloromethane being preferred.

The 0% by volume to 30% by volume of the further solvent or solvent mixture are composed of one or more further solvents which form one phase with the abovementioned mixture. If appropriate, the mixture (B) may also comprise small amounts of water, preferably less than 20% by volume, more preferably less than 10% by volume, even more preferably less than 5% by volume, with no water or no other solvent in the mixture being preferred.

Surprisingly, it has been found that a particularly good extraction is possible with a particular ratio of methanol and dichloromethane. Most preferably, step (b) of the process according to the invention is therefore carried out with a mixture of 30 to 40% by volume of methanol and 60 to 70% by volume of dichloromethane. 40% by volume of methanol and 60% by volume of dichloromethane are most preferred.

A monophasic mixture according to the invention of extracts (A) and (B) is achieved, for example, when the solvent mixture (A) is composed of 80% by volume of methanol and 20% by volume of water and the solvent mixture (B) of 40% by volume of methanol and 60% by volume of dichloromethane and the two extracts are then combined. Advantageously, all of the constituents and optionally for example the standards are therefore present in one phase.

If appropriate, the extraction with (A) or (B) can be repeated once or more than once. However, single passes when carrying out extraction steps are preferred.

In the process according to the invention, fractionation into two or more fractions may also be carried out by means of solid-phase extraction instead of or after phase separation. Fractionation into several fractions has the advantage that the derivatization and analytical methods can be conducted better to the substance groups in question. Thus, in particular fractions which predominantly comprise triglycerides are transesterified prior to the analysis, for example to methyl esters. Solid-phase extraction is particularly well suited for automation.

If appropriate, processing of the extracts can be employed at any desired point of the process described herein between the abovementioned steps as long as the extracts are stored or preserved stably, such as by freezing and/or by freeze-drying the extracts. However, avoiding an interruption during work-up prior to the analysis is preferred.

In an embodiment of the invention, the extraction, for example the extraction of the phase-dried or frozen samples, is supported by further steps, for example by homogenization and dispersing techniques (see above for example in Fiehn, Anal. Chem. 2000 and Nature Biotechnology 2000, Sauter, 1991, Roessner, 2000, Bligh and Dyer, 1959, Strand, 1999 etc.).

Thus, the material can be disrupted by high temperatures, vibrating mill or other grinding methods, pressure or rapid successive pressure changes, ultrasonic, shock-wave, microwave and/or Ultraturrax extraction steps and the constituents extracted better. These methods can be carried out with cooling, for example at 0° C. In the case of freeze-dried material, however, processing at room temperature, i.e. at 15 to 25° C., is also possible. An extraction method which allows the process to be automated is advantageous. Thus, for example, an ASE (accelerated solvent extraction), a PSE (pressurised solvent extraction), a PFE (pressurised fluid extraction) or a PLE (pressurised liquid extraction) can be carried out, where the solvent or solvent mixture is forced through the material under pressure and, if appropriate, at elevated temperature (see Björklund, Trends in Analytical Chemistry 2000, 19 (7), 434-445, Richter, American Laboratory 1995, 27, 24-28,Ezzell, LC-GC 1995, 13 (5), 390-398).

According to the invention, the extraction is carried out in such a way that the temperature and the pressure are adapted such that the constituents are not decomposed and thus the extraction efficacy is sufficient, for example at a temperature of 0° C. or above, with 20° C. being advantageous, 40° C. to 200° C. being more preferred, 150° C. or less are advantageous, 120° C. or less are more preferred. Preferably, the process is carried out at 40 bar or above, more preferably at 70 bar, even more preferably at 100 bar to 200 bar, most preferably at 110 bar to 150 bar. Thus, especially preferred conditions are a temperature of from 60° C. to 80° C., in particular from 70° C., and from 110 bar to 170 bar, in particular 140 bar. The extraction time can be between 30 s and 20 min, with less than 10 min being preferred and 5 min being more preferred. Especially preferred is the use of a temperature of from 60° C. to 80° C. and a pressure of from 110 to 170 bar at an extraction time of less than 5 min. Thus, in accordance with the invention, the extraction conditions are milder than described in the prior art and lead to higher yields and a higher stability of the constituents which are isolated.

In a preferred embodiment, the esterification/transesterification in the polar and/or unpolar phase is carried out with a volatile acid as catalyst, preferably with HF, HI, HCl, $BF_3$, $BCl_3$, HBr, formic acid, acetic acid, trifluoroacetic acid or trichloroacetic acid, with $BF_3$, $BCl_3$, or HCl being more preferred, and with HCl being most preferred as volatile acid as catalyst.

After the extraction, the phases can be divided into various aliquots and, if appropriate, evaporated, for example to remove volatile acids and water and/or to prepare the samples for the following process steps, for example with an IR Dancer (shake device under reduced pressure, heated by infrared radiation), a vacuum centrifuge, or by freeze-drying. Evaporation should be carried out under mild conditions, preferably under 80° C., more preferably under 40° C., preferably under reduced pressure, for example 10 mbar depending on the solvent or solvent mixture. When using dichloromethane/methanol and/or methanol/water mixtures, it is especially preferred to reduce the pressure step-wise down to 10 mbar.

In a further embodiment, the process according to the invention furthermore comprises one or more steps for derivatizing, chromatographing and/or analyzing the constituents, for example from the extracts obtained, or the phases. The extracts or the phases are preferably derivatized, chromatographed and analyzed in the following steps of the process according to the invention. To analyze the extracts further, certain constituents must be derivatized, depending on the separation and analytical methods used. Thus, derivatization is preferred for gas-chromatographic separation (GC), while derivatization is, as a rule, not necessary for separation by liquid chromatography (LC). If appropriate, an analytical method which does not involve chromatographic separation is also possible, for example mass spectrometry (MS), atomic absorption spectrometry (AAS) or nuclear resonance spectrometry (NMR).

In a further preferred embodiment, the extraction process according to the invention additionally comprises at least one of the following further steps:

i) freezing the material, preferably rapid freezing of the material obtained, for example the harvested material;
ii) homogenization and/or dispersion of the material, preferably homogenization and dispersion;
iii) evaporation of the extracts to dryness, preferably following phase separation and/or esterification/transesterification;
iv) carrying out an oxime formation in the unipolar phase;
v) carrying out an oxime formation in the polar phase;
vi) carrying out a trialkylsilylation in the unpolar phase; or
vii) carrying out a trialkylsilylation in the polar phase.

The process according to the invention advantageously contains the individual abovementioned steps, more preferably more than one of the abovementioned steps, and most preferably all of the abovementioned steps, with the sequence stated herein being especially preferred.

After harvesting, the organic material is advantageously cooled instantly, better frozen instantly, to prevent any enzymatic activity in the sample or in the material in this manner and thus to avoid a change in the distribution of the constituents. Preferably, freezing of the material after obtaining or harvesting it is carried out in less than 60 s, with 30 s being more preferred and 15 s or less being most preferred. If the material takes the form of plant material, sampling can be effected directly in the phytotrone chamber. After obtaining the material, the latter is advantageously weighed rapidly and then frozen rapidly at a low temperature, for example in liquid nitrogen, and stored for example at −80° C. or in liquid nitrogen.

After the esterification/transesterification, the solution can be evaporated, preferably to dryness, in order to remove the acid, for example to remove volatile acids and water and to prepare the samples for the following process steps, for example IR-Dancer, vacuum centrifuge or by freeze-drying. Evaporation should be carried out under mild conditions, preferably between 5° C. and 80° C., more preferably between 20° C. and 40° C. It is also preferred to carry out the process under reduced pressure, for example at 100 mbar to 10 mbar, depending on the solvent or solvent mixture. When using dichloromethane/methanol and/or methanol/water mixtures, reducing the pressure stepwise to, for example, 10 mbar is especially preferred. The solvents employed can aid the drying step, for example by being particularly volatile or by aiding the evaporation of water when acting as entrainer, such as, for example, toluene.

In a further preferred embodiment, an oxime formation in the unpolar and/or polar phase is carried out in the process according to the invention. In accordance with the invention, an oxime is understood as meaning a compound of the structure (I) R—ONR'

(I)

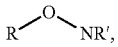

where R can be H or an alkyl radical, preferably an alkyl radical having 1 to 6 carbon atoms, in particular a methyl, ethyl, propyl, butyl, pentyl or hexyl radical, or a substituted or unsubstituted arylalkyl radical, preferably with 5 to 7 carbon atoms in the arylalkyl radical and with 0 to 2 hetero atoms in the ring or in the chain of the arylalkyl radical, for example a substituted or unsubstituted benzyl radical, in particular a halogenated benzyl radical with 1 to 7 halogen radicals, preferably a pentafluorobenzyl radical, it being possible for R' to be any divalent radical.

In accordance with the invention, reactants which can be used for oxime formation are compounds of the structure (Ib) R—$ONH_2$, where R is as defined above, preferably hydroxylamine or O-substituted hydroxylamines or in each case their salt with a volatile acid, for example hydrochlorides, such as O-alkylhydroxylamine hydrochloride or O-pentafluorobenzylhydroxylamine-hydrochloride, by processes known to the skilled worker (see also Fiehn, Anal. Chem. 2000), for example dissolved in a suitable solvent mixture or solvent, such as, for example, pyridine. Preferred is a process according to the invention wherein O-methyl-hydroxylamine-hydrochloride (II), O-pentafluorobenzylhydroxylamine-hydrochloride (III) or O-ethylhydroxylamine-hydrochloride (IV) is employed for the oxime formation, with O-methylhydroxylamine-hydrochloride (II) being most preferred.

(Ib)

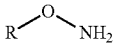

-continued (II)

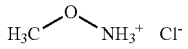

(III)

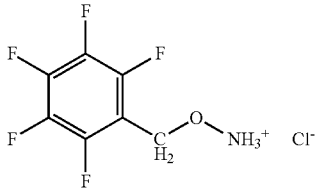

(IV)

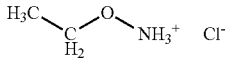

The reaction can be carried out for 30 min to 6 h, preferably for 1 h to 2 h, preferably from at least 20° C. to 80° C., more preferably at from 50° C. to 60° C. It is especially preferred to carry out the reaction from 1 h to 2 h at from 50° C. to 60° C.

In a further embodiment according to the invention, a trialkylsilylation is carried out in the polar and/or unpolar phase. The trialkylsilylation can be carried out in accordance with the invention with a compound of the formula $Si(R^{1-4})_4$, $R^4$ preferably being an N—$C_{1-4}$-alkyl-2,2,2-trifluoroacetamide, especially preferably an N-methyl-2,2,2-trifluoroacetamide, as in formula (V). Especially preferred is thus the trialkylsilylation with a compound of the formula (V)

(V)

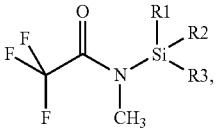

where $R^1$, $R^2$ and/or $R^3$ independently of one another can be alkyl radicals with in each case 1 to 6 carbon atoms, in particular $CH_3$, $C_2H_5$, $C_3H_7$ or $C_4H_9$ with the following structural formulae for $C_3H_7$ and $C_4H_9$:

(VI)

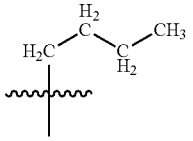

(VII)

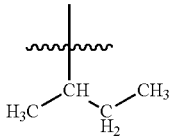

(VIII)

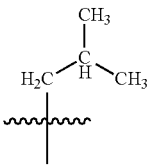

-continued (IX)

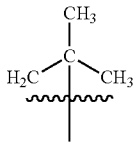

(X)

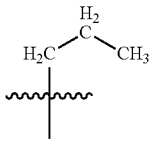

(XI)

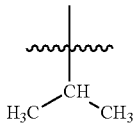

$R^1$ or $R^2$ are preferably methyl radicals, $R^1$ and $R^2$ are especially preferably methyl radicals. $R^3$ is preferably a straight-chain or branched alkyl radical having 1 to 4 carbon atoms as described above, especially preferably a methyl radical or tert-butyl radical, with $R^3$ more preferably being a methyl radical. A trimethylsilylation is preferably carried out with MSTFA (N-methyl-N-(trimethylsilyl)-2,2,2-trifluoroacetamide). The reaction can be carried out for 10 min to 120 min, preferably for 20 min to 60 min, at from 20° C. to 90° C., preferably at between 40° C. and 70° C.

Before the trialkylsilylation, preferably one or more internal standard(s) and/or chromatographic standard(s) may be added.

In one embodiment, solvents or solvent mixtures are used in the extraction method according to the invention which additionally comprise up to 5% by weight of buffer salts, acids and/or bases, with up to 3% by weight being more preferred and up to 1% by weight being even more preferred. Volatile buffer sytsems are preferred. Thus, for example, ammonium formate solution, ammonium carbonate solution, ammonium chloride solution, ammonium acetate solution or ammonium hydrogen carbonate solution and/or an acid, for example formic acid, acetic acid, trifluoroacetic acid, pentafluoropropanoic acid, heptafluorobutanoic acid, monofluoropentanoic acid, undecafluorohexanoic acid, tridecafluoroheptanoic acid or pentadecafluorooctanoic acid and/or a base such as, for example, triethylamine, pyridine or ammonia may be employed in accordance with the invention.

It is advantageous to treat the combined mixture of step (c) with one or more analytical standards, for example internal standards and/or chromatographic standards. Examples of such standards can be compounds which do not occur in the natural samples, but which are similar to the substances analyzed, including isotope-labelled, radiolabelled or fluorescence-labelled substances, as in the case of sugars for example ribitol or alpha-methylglucopyranoside, in the case of amino acids for example L-glycine-2,2-$d_2$ or L-alanine-2,3,3,3-$d_4$ in the case of fatty acids or their derivatives in particular odd-numbered fatty acids or their methyl esters, for example methyl undecanoate, methyl tridecanoate or ethyl nonocosanoate. The standards may also be added individually to the respective extract of step (b).

The process according to the invention also encompasses steps for separation and analysis, it being possible for the extract to be separated advantageously by LC, GC or CE (capillary electrophoresis).

After the above-stated evaporation step, the extracts prepared in accordance with the invention can be taken up in HPLC solvents or solvent mixtures and then analyzed by LC. Suitable eluents are mixtures of, for example, methanol, acetonitrile or ethanol and/or tert-butyl methyl ether (methyl tert-butyl ether), tetrahydrofuran, isopropanol or acetone and/or water and/or a salt, such as, for example, ammonium formate solution, ammonium carbonate solution, ammonium chloride solution, ammonium acetate solution or ammonium hydrogen carbonate solution and/or an acid, for example formic acid, acetic acid, trifluoroacetic acid, pentafluoropropanoic acid, heptafluorobutanoic acid, nonoafluoropentanoic acid, undecafluorohexanoic acid, tridecafluoroheptanoic acid or pentadecafluorooctanoic acid and/or a base such as, for example, triethylamine, pyridine or ammonia, depending on whether it is polar or unpolar extracts which are to be separated. As a rule, gradient elution is carried out, preferably followed by mass-spectrometric detection, for example MS or MS/MS detection (detection by single mass spectrometry or tandem mass spectrometry).

After GC, the constituents can be detected for example by EI-MS (electron-impact ionization and analysis by mass spectrometer) or CI-MS (chemical ionization and analysis by means of mass spectrometer), sector-field mass spectrometer, quadrupole mass spectrometry, time-of-flight mass spectrometry, ion-trap mass spectrometry or Fourier transform ion cyclotron resonance mass spectrometry, FID (flame ionization detector) or Fourier transform infrared spectroscopy, and after LC for example by means of sector-field mass spectrometry, quadrupole mass spectrometry, time-of-flight mass spectrometry, ion-trap mass spectrometry or Fourier transform ion cyclotron resonance mass spectrometry, UV/Vis absorption detection, fluorescence detection, NMR or infrared spectroscopy. The process according to the invention preferably comprises an MS (mass spectrometry) analysis, an LC/MS (liquid chromatography coupled to any mass spectrometry detection) analysis, GC/MS (gas chromatography coupled to any mass spectrometric detection) analysis and/or LC/MS/MS analysis (liquid chromatography coupled to any tandem mass spectrometric detection), most preferably an LC/MS analysis, GC/MS analysis and/or LC/MS/MS analysis.

In accordance with the process according to the invention, the extracts can therefore first be dried and redissolved, and then fractionated and/or saturated in a suitable solvent or solvent mixture, for example by means of LC and/or GC, and the constituents can then be analyzed, detected and quantified, for example by MS.

To carry out the GC analysis, a transesterification/esterification, in particular with methanol or ethanol, followed by an oxime formation, preferably a methoxylation, can be carried out with the unpolar phase and/or the polar phase, as described above. Preferably, standard substances, for example chromatography and/or internal standards, can be added to each sample or to the respective extract, for example a solution of odd-numbered, straight-chain fatty acids or hydrocarbons. The extracts are subsequently trialkylsilylated, oximation and/or trialkylsilylation of the unpolar phase being optional.

These steps can be carried out as described herein, but can also be combined individually with other steps, for example other separation and analytical methods, and adapted to suit these methods.

In an especially preferred embodiment, the material consists of plant material. Most of the prior art only describes the analysis starting from fluids, but not from solid material. The processing of plant cells differs from that of animal cells or tissues in as far as animal cells only have a cell membrane, but plant cells are surrounded by a cell wall. For example, plant populations or plant species, for example genetically modified or stressed plants, can be extracted. Also, homogenates can be prepared from a large number of organisms. To verify sensitivity, accuracy, precision, variability and reproducibility, standard solutions, or material mixed with standard solutions, can be assayed in the process. To this end, the organic material can be supplemented for example with defined amounts of standard substances.

The information and data obtained by the process according to the invention are preferably automatically evaluated and stored in a database. In the case of large sample numbers, automatic peak recognition and peak integration of the data obtained is preferably employed.

In a preferred embodiment, the process according to the invention is optimized for high throughput, low variability and high reproducibility and preferably comprises the following steps:

(i) obtaining the organic material and cooling or freezing the material within 60 seconds after obtaining it;
(ii) freeze-drying the material;
(iii) extracting the material with solvent mixture (A) of 80% by volume of methanol and 20% by volume of water and solvent mixture (B) of 40% by volume of methanol and 60% by volume of dichloromethane, and combining the extracts;
(iv) adding standards to the extract(s);
(v) following phase separation and esterification/transesterification, evaporating the extracts to dryness;
(vi) carrying out an esterification/transesterification in the unpolar phases with HCl; and
(vii) analysing the extracts by MS, LC/MS, LC/MS/MS and/or GC/MS analysis.

Especially preferred is a process in which the organic material is extracted by ASE. If appropriate, the extracts can be fractionated further by a solid-phase extraction.

In a further embodiment, the process is part of a process for analyzing a metabolic profile. The invention thus advantageously relates to a high-throughput process for establishing a metabolic profile, encompassing the process steps as claimed in any of claims 1 to 14 and the following further step:

(viii) analysis of the resulting data by automatic peak recognition and peak integration.

Establishing, in a large number of samples, a complex metabolic profile of the metabolites and constituents present in an organic sample makes possible the direct study of immediate growth, developmental or stress factors on the entire organism or part thereof, and is therefore an essential part of functional genome analysis in the determination of gene functions. Processes for analyzing complex metabolic profiles, in particular when suitable for analyzing larger numbers of samples, permit the complexity of the regulatory interactions to be at all levels and during all stages and the effect of endogenous and exogenous factors to be studied.

Thus, the process according to the invention can be used, for example, to study a) effects of genetic differences on the metabolic profile,
b) the effect of, for example, environmental conditions, stress, chemical substances and the like,
c) the interaction between a) and b) or
d) the course over time of a), b) or c), as is the case for example in studies into the effect of one or more substances (including, for example, substance libraries) or stress factors such as, for example, drought, high and low temperatures, frost, deficiency, salt, light deprivation and the like, on the metabolic profile of, for example, organisms which are as genetically identical as possible, organisms which are genetically related, down to organisms which are as genetically different as possible.

The present invention is illustrated by the examples which follow, without this implying any limitation whatsoever.

EXAMPLE 1

Sampling and Sample Storage

Sampling takes place directly in the phytotrone chamber. The plants were coupled using small laboratory scissors, weighed rapidly on a laboratory scale, transferred into a pre-cooled extraction thimble and placed into an aluminum rack cooled by liquid nitrogen. If required, the extraction thimbles can be stored in the freezer at −80° C. The time between cutting off the plant and freezing the plant in liquid nitrogen does not exceed 10 to 20 sec.

EXAMPLE 2

Freeze-Drying

Care was taken that, during the experiment, the plants either remained in the sub-zero state (temperatures <−40° C.) or were freed from water by freeze-drying before they came into the first contact with solvents.

The aluminum rack with the plant samples in the extraction thimbles was placed into the pre-cooled (−40° C.) freeze-drier. The initial temperature during the main drying step was −35° C., and the pressure was 0.120 mbar. During drying, the parameters were altered following a pressure and temperature program. The final temperature after 12 hours was +30° C., and the final pressure was at 0.001 to 0.004 mbar. After the vacuum pump and the refrigerating installation had been switched off, the system was ventilated with air (dried by means of a drying tube) or with argon.

EXAMPLE 3

Extraction

Immediately after the freeze drier was ventilated, the extraction thimbles with the freeze-dried plant material were transferred into the 5 mL ASE extraction cartridges.

The 24 sample positions of an ASE apparatus (Accelerated Solvent Extractor ASE 200 with Solvent Controller and AutoASE software (DIONEX)) are filled with plant samples.

The polar substances were extracted with approx. 10 mL methanol/water (80/20, v/v) at T=70° C. and p=140 bar, 5 min heating phase, 1 min static extraction. The more lipophilic substances were extracted with approx. 10 mL of methanol/dichloromethane (40/60, v/v) at T=70° C. and p=140 bar, 5 min heating phase, 1 min static extraction. The two solvent mixtures are extracted into the same sample tube (centrifuge tube, 50 mL, with screw top and piercible septum for the ASE (DIONEX)).

Internal standards were added to the solution: ribitol, L-glycine-2,2-$d_2$, L-alanine-2,3,3,3-$d_4$ and α-methylglucopyranoside, and methyl nonadecanoate, methyl undecanoate, methyl tridecanoate and methyl nonacosanoate.

7 mL of water were added to the total extract. The solid residue of the plant sample and the extraction thimble were discarded.

The extract was shaken and then centrifuged for 5 to 10 min at at least 1400 g in order to accelerate phase separation. 1 mL of the supernatant methanol/water phase ("polar phase", colorless) was removed for the subsequent GC analysis, and 1 mL was removed for the LC analysis. The remainder of the methanol/water phase was discarded. The organic phase was again washed with the same volume of water (7 mL) and centrifuged. 0.5 mL of the organic phase ("lipid phase" dark green) was removed for the subsequent GC analysis, and 0.5 mL was removed for the LC analysis. All of the aliquots removed were evaporated to dryness using the IR-Dancer infrared vacuum evaporator (Hettich). The maximum temperature during the evaporation process did not exceed 40° C. The pressure within the apparatus was not less than 10 mbar.

EXAMPLE 4

Processing the Lipid Phase for the LC/MS or LC/MS/MS Analysis

The lipid extract which has been evaporated to dryness was taken up in eluent. The HPLC run was carried out with gradient elution.

EXAMPLE 5

Processing the Polar Phase for the LC/MS or LC/MS/MS Analysis

The polar extract which has been evaporated to dryness was taken up in eluent. The HPLC run was carried out with gradient elution.

EXAMPLE 6

Derivatization of the Lipid Chase for the GC/MS Analysis

To carry out the transmethanolysis, a mixture of 140 μl of chloroform, 37 μl of hydrochloric acid (37% by weight of HCl in water), 320 μl of methanol and 20 μl of toluene were added to the evaporated extract. The container was sealed and heated for 2 hours at 100° C., with shaking. The solution was subsequently evaporated to dryness. The residue was dried completely.

Methoximation of the carbonyl groups was effected by reaction with methoxyamine hydrochloride (5 mg/mL in pyridine, 100 μl) for 1.5 hours at 60° C. in a sealed vessel. 20 μl of a solution of odd-numbered, straight-chain fatty acids were added as time standards. Finally, a derivatization was carried out with 100 μl of N-methyl-N-(trimethylsilyl)-2,2,2-trifluoroacetamide (MSTFA) for 30 minutes at 60° C., again in a sealed vessel. The end volume prior to GC injection was 200 μl.

EXAMPLE 7

Derivatization of the Polar Phase for the GC/MS Analysis

The methoximation and trimethylsilylation with MSTFA were carried out as described for the lipid phase.

We claim:

1. A [high-throughout] *high-throughput* process for isolating constituents from an organic material, comprising:

a) freeze-drying the organic material;

b) extracting the freeze-dried organic material with 1) a polar solvent or solvent mixture to form an extract A, and 2) an organic solvent or solvent mixture to form an extract B;

c) combining the extract A and the extract B to form one phase;

d) treating the combined extracts of step c) with an alcohol in the presence of a volatile acid to carry out an [esterfication/transesterfication] *esterification/transesterification*; and e) isolating the constituents.

2. The process of claim 1, wherein the polar solvent or solvent mixture comprises a monophasic mixture of 50 to 90% by volume of $C_1$-$C_6$-alkyl alcohol, 10 to 50% by volume of water, and 40 to 0% by volume of a further solvent or solvent mixture.

3. The process of claim 1, wherein the organic solvent or solvent mixture comprises a monophasic mixture of 30% by volume to 60% by volume of $C_1$- to $C_6$-alkyl alcohol, 40% by volume to 70% by volume of chloroform or dichloromethane, and 0% by volume to 30% by volume of a further solvent or solvent mixture.

4. The process of claim 1, wherein [the] the extraction is carried out by means of accelerated solvent extraction, pressurized liquid extraction, pressurized fluid extraction, ultrasonic extraction, shock-wave extraction, microwave extraction, or by means of a vibrating mill or an Ultraturrax.

5. The process of claim 1, wherein the extraction is carried out at a temperature of from 0° C. to 200° C., at a pressure of from 40 bar to 200 bar, or at both said temperature and said pressure.

6. The process of claim 1, wherein the volatile acid is HCl, HBr, $BF_3$, $BCl_3$, trifluoroacetic acid, trichloroacetic acid, or HI.

7. The process of claim 1, wherein the alcohol is saturated, unsaturated, straight-chain, branched-chain, or cyclic alkyl alcohol with 1 to 8 carbon atoms.

8. The process of claim 1, wherein the constituents are derivatized, chromatographed, and/or analyzed in one or more further steps.

9. The process of claim 1, further comprising:

i) freezing the organic material;

ii) homogenizing and/or dispersing the organic material;

iii) following phase separation or esterification/transesterification, evaporating the extract to dryness;

iv) carrying out an oxime formation in the unpolar phase;

v) carrying out an oxime formation in the polar phase;

vi) carrying out a trialkylsilylation in the unpolar phase; and/or vii) carrying out a trialkylsilylation in the polar phase.

10. The process of claim 9, wherein the trialkylsilylation is a trimethylsilylation.

11. The process of claim 1, wherein the extract A, the extract B or the combined extracts are treated with one or more internal standards.

12. The process of claim 1, wherein the extracted constituents are analyzed by LC, MS, GC, LC/MS, GC/MS and/or LC/MS/MS analysis.

13. The process of claim 1, wherein the solvent or solvent mixture further comprises up to 5% by weight of buffer salts, acids, and/or bases.

14. The process of claim 1, wherein the organic material consists of plant material.

15. A [high-throughout] *high-throughput* process for establishing a metabolic profile, comprising the process steps of claim 1 and further comprising analyzing the isolated constituents by automatic peak recognition or peak integration.

*16. A high-throughout process for the separation of constituents from an organic material, comprising:*

*a) freeze-drying the organic material;*

*b) extracting the freeze-dried organic material with*

*1) a polar solvent or solvent mixture to form an extract A, and*

*2) an organic solvent or solvent mixture to form an extract B;*

*c) combining the extract A and the extract B to form one phase;*

*d) to obtain an unpolar phase and a polar phase, treating the combined extracts of step c) with*

*1) an unpolar solvent or solvent mixture,*

*2) a polar solvent or solvent mixture, or*

*3) an unpolar solvent or solvent mixture and a polar solvent or solvent mixture; and*

*e) performing an esterification/transesterification of the constituents contained in the unpolar phase with an alcohol in the presence of a volatile acid.*

*17. The process of claim 16, further comprising evaporating the solvent of the unpolar phase.*

*18. The process of claim 16, wherein the polar solvent or solvent mixture comprises a monophasic mixture of 50 to 90% by volume of $C_1$-$C_6$-alkyl alcohol, 10 to 50% by volume of water, and 40 to 0% by volume of a further solvent or solvent mixture.*

*19. The process of claim 16, wherein the organic solvent or solvent mixture comprises a monophasic mixture of 30% by volume to 60% by volume of $C_1$- to $C_6$-alkyl alcohol, 40% by volume to 70% by volume of chloroform or dichloromethane, and 0% by volume to 30% by volume of a further solvent or solvent mixture.*

*20. The process of claim 16, wherein the extraction is carried out by means of accelerated solvent extraction, pressurized liquid extraction, pressurized fluid extraction, ultrasonic extraction, shock-wave extraction, microwave extraction, or by means of a vibrating mill or an Ultraturrax.*

*21. The process of claim 16, wherein the extraction is carried out at a temperature of from 0° C. to 200° C., at a pressure of from 40 bar to 200 bar, or at both said temperature and said pressure.*

*22. The process of claim 16, wherein the volatile acid is HCl, HBr, $BF_3$, $BCl_3$, trifluoroacetic acid, trichloroacetic acid, or HI.*

*23. The process of claim 16, wherein the alcohol is saturated, unsaturated, straight-chain, branched-chain, or cyclic alkyl alcohol with 1 to 8 carbon atoms.*

*24. The process of claim 16, wherein the constituents are derivatized, chromatographed, and/or analyzed in one or more further steps.*

*25. The process of claim 16, further comprising one or more of:*

*i) freezing the organic material;*

*ii) homogenizing and/or dispersing the organic material;*

*iii) following phase separation or esterification/transesterification, evaporating the extract to dryness;*

*iv) carrying out an oxime formation in the unpolar phase;*

*v) carrying out an oxime formation in the polar phase;*

*vi) carrying out a trialkylsilylation in the unpolar phase; or*

*vii) carrying out a trialkylsilylation in the polar phase.*

*26. The process of claim 25, wherein the trialkylsilylation is a trimethylsilylation.*

*27. The process of claim 16, wherein the extract A, the extract B, or the combined extracts are treated with one or more internal standards.*

*28. The process of claim 16, wherein the extracted constituents are analyzed by LC, MS, GC, LC/MS, GC/MS and/or LC/MS/MS analysis.*

*29. The process of claim 16, wherein the solvent or solvent mixture further comprises up to 5% by weight of buffer salts, acids, and/or bases.*

*30. The process of claim 16, wherein the organic material consists of plant material.*

*31. A high-throughout process for establishing a metabolic profile, comprising the process steps of claim 16 and further comprising analyzing the constituents by automatic peak recognition or peak integration.*

*32. The process of claim 16, further comprising adding water to the combined extracts of step c).*

*33. The process of claim 16, wherein the extraction of step (b)(1) and the extraction of step (b)(2) are carried out in succession, wherein the extraction of step (b)(1) is carried out followed by the extraction of step (b)(2), or the extraction of step (b)(2) is carried out followed by the extraction of step (b)(1).*

*34. The process of claim 16, wherein the extract A, the extract B, or the combined extracts are treated with one or more analytical standards, wherein the analytical standard is an isotope-labeled, radiolabeled, or fluorescence-labeled substance.*

* * * * *